United States Patent
Uchino et al.

(10) Patent No.: US 9,942,828 B2
(45) Date of Patent: *Apr. 10, 2018

(54) WIRELESS COMMUNICATION APPARATUS, WIRELESS COMMUNICATION METHOD, AND COMPUTER-READABLE RECORDING MEDIUM

(71) Applicant: FUJITSU LIMITED, Kawasaki-shi, Kanagawa (JP)

(72) Inventors: Makoto Uchino, Hamura (JP); Eiji Iimori, Kawasaki (JP); Yoshiaki Hata, Nishitokyo (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

This patent is subject to a terminal disclaimer.

(21) Appl. No.: 14/670,510

(22) Filed: Mar. 27, 2015

(65) Prior Publication Data
US 2015/0289193 A1    Oct. 8, 2015

(30) Foreign Application Priority Data
Apr. 8, 2014    (JP) ................................ 2014-079752

(51) Int. Cl.
*H04W 40/16*    (2009.01)
*H04W 40/24*    (2009.01)
(Continued)

(52) U.S. Cl.
CPC ......... *H04W 40/16* (2013.01); *H04W 40/125* (2013.01); *H04W 40/246* (2013.01);
(Continued)

(58) Field of Classification Search
CPC . H04W 40/16; H04W 40/125; H04W 72/085; H04W 40/246
See application file for complete search history.

(56) References Cited

U.S. PATENT DOCUMENTS

2002/0168959 A1    11/2002    Noguchi et al.
2006/0008085 A1    1/2006    Matsuo
(Continued)

FOREIGN PATENT DOCUMENTS

EP    1341351 A1    9/2003
EP    1777925 A2    4/2007
(Continued)

OTHER PUBLICATIONS

USPTO, [Rachedine] Non-Final Rejection, dated Feb. 16, 2016, in co-pending U.S. Appl. No. 14/503,722 [pending].
(Continued)

*Primary Examiner* — Yemane Mesfin
*Assistant Examiner* — Henry Baron
(74) *Attorney, Agent, or Firm* — Fujitsu Patent Center (57) ABSTRACT

A wireless communication apparatus determines the ratio of sockets which are allocated to a first wireless interface using a first communication network and sockets which are allocated to a second wireless interface using a second communication network, on the basis of the radio quality of the first communication network and the radio quality of the second communication network. The wireless communication apparatus generates the sockets in accordance with the determined ratio and performs wireless communication. The wireless communication apparatus measures the amount of traffic through the first wireless interface and the amount of traffic through the second wireless interface in the wireless communication using the sockets which are generated in accordance with the determined ratio. The wireless communication apparatus corrects the number of sockets allocated to the first wireless interface and the second wireless interface on the basis of the measured amounts of traffic.

5 Claims, 7 Drawing Sheets

(51) Int. Cl.
*H04W 40/12* (2009.01)
*H04W 72/08* (2009.01)
*H04W 28/08* (2009.01)
*H04W 88/06* (2009.01)

(52) U.S. Cl.
CPC ........ *H04W 72/085* (2013.01); *H04W 28/085* (2013.01); *H04W 88/06* (2013.01)

(56) References Cited

U.S. PATENT DOCUMENTS

| | | |
|---|---|---|
| 2008/0040489 A1 | 2/2008 | Hockett et al. |
| 2008/0147777 A1 | 6/2008 | Azulai |
| 2008/0177872 A1 | 7/2008 | Vengroff |
| 2010/0128698 A1 | 5/2010 | Ishizu et al. |
| 2012/0063449 A1 | 3/2012 | Frederic et al. |
| 2012/0120848 A1 | 5/2012 | Hedge et al. |
| 2012/0208502 A1 | 8/2012 | Perras |
| 2013/0070601 A1 | 3/2013 | Shen |
| 2013/0088961 A1* | 4/2013 | Ramachandran ..... H04L 47/125 370/235 |
| 2013/0095806 A1 | 4/2013 | Salkintzis et al. |
| 2013/0133041 A1 | 5/2013 | Magyar et al. |
| 2013/0143542 A1 | 6/2013 | Kovvali et al. |
| 2014/0149603 A1 | 5/2014 | Park et al. |
| 2014/0226658 A1* | 8/2014 | Kakadia ............. H04L 43/0882 370/389 |
| 2014/0323178 A1 | 10/2014 | Wei et al. |
| 2015/0029956 A1 | 1/2015 | Moses et al. |
| 2015/0100628 A1 | 4/2015 | LaPine et al. |
| 2015/0105115 A1 | 4/2015 | Hata et al. |
| 2015/0120865 A1 | 4/2015 | Lee et al. |
| 2015/0289252 A1 | 10/2015 | Uchino et al. |
| 2016/0234337 A1 | 8/2016 | Wilcox et al. |

FOREIGN PATENT DOCUMENTS

| | | |
|---|---|---|
| EP | 1786151 A2 | 5/2007 |
| EP | 2879428 A1 | 6/2015 |
| JP | 2002-335278 | 11/2002 |
| JP | 2004-336720 | 11/2004 |
| JP | 2008-42938 | 2/2008 |
| JP | 2008-136150 | 6/2008 |
| JP | 2009-038653 | 2/2009 |
| JP | 2010-124374 | 6/2010 |
| JP | 2011-155353 | 8/2011 |
| JP | 2011-166251 | 8/2011 |
| JP | 2013-511867 | 4/2013 |
| JP | 2013-207731 | 10/2013 |
| WO | 2012/145720 A1 | 10/2012 |

OTHER PUBLICATIONS

EESR—Extended European Search Report of European Patent Application No. 14186684.8, dated May 4, 2015.
EESR—The Extended European Search Report dated Aug. 28, 2015 for corresponding European Patent Application No. 15158968.6.
Kim et al., "MAC—Level Measurement Based Traffic Distribution over IEEE 802.11 Multi-Radio Networks", IEEE Transactions on Consumer Electronics, IEEE Service Center, New York, US, vol. 54, No. 3, pp. 1185-1191, XP011235565.
USPTO, [Rachedine] Notice of Allowance dated Jul. 1, 2016 in co-pending U.S. Appl. No. 14/503,722 [issued].
USPTO, [Rachedine] Supplemental/Corrected Notice of Allowance dated Oct. 14, 2016 in co-pending U.S. Appl. No. 14/503,722 [issued].
EESR—Extended European Search Report dated Jul. 6, 2015 issued for European Patent Application No. 15160164.8.
Hsieh et al., "A Transport Layer Approach for Achieving Aggregate Bandwidths on Multi-homed Mobile Hosts", Proceedings of the 8th; Annual International Conference on Mobile Computing and Networking; Mobicom 2002; Sep. 23-28, 2002. vol. CONF 8; pp. 83-94, XP001171458; New York, ACM, USA.
USPTO, [Renner], Non-Final Rejection dated Aug. 17, 2016 in related U.S. Appl. No. 14/672,949 [pending].
USPTO, [Renner], Final Rejection dated Jan. 12, 2017 in related U.S. Appl. No. 14/672,949 [pending].
USPTO, [Renner], Non-Final Rejection dated May 1, 2017 in related U.S. Appl. No. 14/672,949 [pending].
JPOA—Japanese Office Action dated Mar. 28, 2017 for Japanese Patent Application No. 2013-213247, with English translation.
JPOA—Japanese Office Action dated Dec. 5, 2017 for Japanese Patent Application No. 2014-079628, with English translation.
USPTO, [Renner] Final Rejection dated Sep. 13, 2017 in related U.S. Appl. No. 14/672,949 [pending].
JPOA—Japanese Office Action dated Oct. 3, 2017 for Japanese Patent Application No. 2014-079752, with machine translation.

* cited by examiner

|  | LTE | HSPA | WCDMA | GPRS |
|---|---|---|---|---|
| CARRIER'S PUBLIC NETWORK | EVALUATION TABLE A <br> 0 \| 1 \| ...... \| 9 | EVALUATION TABLE B | EVALUATION TABLE C | EVALUATION TABLE D |
| HOME NETWORK | EVALUATION TABLE E | EVALUATION TABLE F | EVALUATION TABLE G | EVALUATION TABLE H |
| GENERAL PUBLIC NETWORK | EVALUATION TABLE I | EVALUATION TABLE J | EVALUATION TABLE K | EVALUATION TABLE L |

FIG.5

WIRELESS COMMUNICATION APPARATUS, WIRELESS COMMUNICATION METHOD, AND COMPUTER-READABLE RECORDING MEDIUM

CROSS-REFERENCE TO RELATED APPLICATION

This application is based upon and claims the benefit of priority of the prior Japanese Patent Application No. 2014-079752, filed on Apr. 8, 2014, the entire contents of which are incorporated herein by reference.

FIELD

The embodiments discussed herein are related to a wireless communication apparatus, a wireless communication method, and a wireless communication program.

BACKGROUND

Mobile terminals, such as smart phones, have a communication means for connection to a mobile network, such as a long-term evolution (LTE) network or a $3^{rd}$ generation (3G) network and a communication means for connection to a wireless local area network (LAN) such as a wireless fidelity (Wi-Fi) network.

In general, the mobile terminal is connected to the wireless LAN with high priority in an environment in which the mobile terminal can be connected to both the mobile network and the wireless LAN. When the wireless LAN is not available, the mobile terminal switches to the mobile network and performs communication. Some mobile terminals have a link aggregation function of performing communication using the mobile network and the wireless LAN at the same time. For example, the mobile terminal performs communication related to an application B using the wireless LAN while performing communication related to an application A using the mobile network.

Patent Document 1: Japanese Laid-open Patent Publication No. 2008-136150

Patent Document 2: Japanese Laid-open Patent Publication No. 2011-166251

However, in recent years, a mobile terminal has been proposed which generates sockets in the wireless LAN and the mobile network, writes data to the sockets, and transmits the data when one application is executed.

It is considered that the mobile terminal optimizes the ratio of the sockets allocated to each network on the basis of the quality of each network. However, in some cases, communication is not performed at the determined optimum ratio due to the reuse of the sockets or a difference in the amount of data written to the sockets and the communication performance is reduced.

For example, when a large amount of data is transmitted through the LTE network, the sockets are reused in the LTE network even though the allocation ratio of the sockets to the Wi-Fi network is high. As a result, the usage efficient of the sockets in the Wi-Fi network is reduced and the entire communication performance is reduced.

SUMMARY

According to an aspect of the embodiment, a wireless communication apparatus includes a memory; and a processor that is connected to the memory, wherein the processor executes a process. The process includes determining a ratio of sockets which are allocated to a first wireless interface using a first communication network and sockets which are allocated to a second wireless interface using a second communication network, on the basis of a radio quality of the first communication network and a radio quality of the second communication network; generating the sockets in accordance with the ratio determined at the determining and performing wireless communication; measuring an amount of traffic through the first wireless interface and an amount of traffic through the second wireless interface in the wireless communication using the sockets which are generated in accordance with the ratio; and correcting the number of sockets allocated to the first wireless interface and the second wireless interface on the basis of the amounts of traffic measured at the measuring.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The invention is not limited to the embodiments.

[a] First Embodiment

Overall Structure

Figure 1:
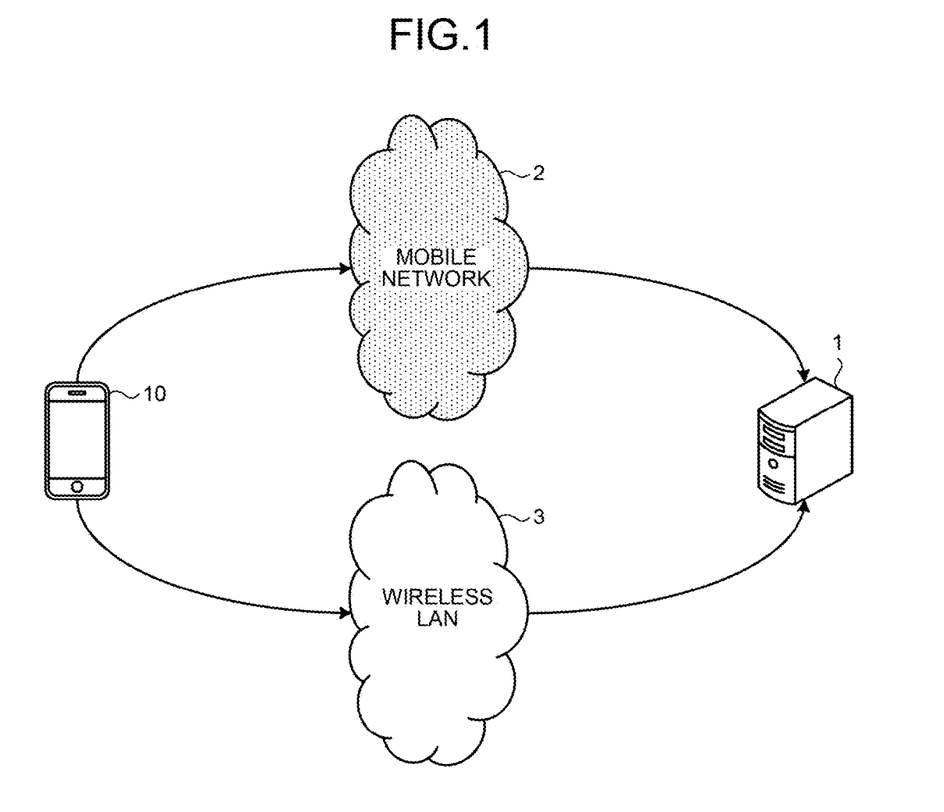
FIG. 1 is a diagram illustrating an example of the overall structure of a system according to a first embodiment.

FIG. 1 is a diagram illustrating an example of the overall structure of a system according to a first embodiment. As illustrated in FIG. 1, in the system, a mobile terminal 10 and a Web server 1 are connected so as to communicate with each other through a mobile network 2 and a wireless LAN 3. In this embodiment, the mobile terminal 10 communicates with the Web server 1. However, the communication destination of the mobile terminal 10 is not particularly limited by the embodiment.

An example of the mobile network 2 is an LTE network or a 3G network and an example of the wireless LAN 3 is a Wi-Fi network or a worldwide interoperability for microwave access (WiMAX) network. For example, the number of apparatuses is an illustrative example and is not particularly limited. In this embodiment, an example in which the Wi-Fi network and the LTE network are used will be described.

The Web server 1 is a server apparatus that provides Web services to the client and is managed by, for example, a mobile phone company. The Web server 1 performs user authentication for a client terminal and provides various Web services to the authenticated client terminal.

The mobile terminal 10 is a client terminal that executes applications to communicate with the Web server 1 and is, for example, a smart phone, a mobile phone, or a notebook personal computer. The mobile terminal 10 includes antennas corresponding to each communication network and can perform communication using the communication networks at the same time.

For example, the mobile terminal 10 establishes a connection to the Wi-Fi network, using a Wi-Fi internet protocol (IP) address and a port number used by an application A, and the Wi-Fi IP address of the Web server 1 and the port number used by the application A. Then, the mobile terminal 10 opens the sockets and writes data to the sockets such that the Web server 1 reads the data. The Web server 1 returns a request from the mobile terminal 10 and the mobile terminal 10 receives the data using the sockets. When the communication between the mobile terminal 10 and the Web server 1 is completed, the mobile terminal 10 closes the sockets. The mobile terminal 10 performs this process for each of the sockets allocated to the Wi-Fi network and performs socket communication through the Wi-Fi network.

The mobile terminal 10 establishes a connection to the LTE network, using an LTE IP address and the port number used by the application A, and the LTE IP address of the Web server 1 and the port number used by the application A. Then, the mobile terminal 10 opens the sockets and writes data to the sockets such that the Web server 1 reads the data. The Web server 1 returns a request from the mobile terminal 10 and the mobile terminal 10 receives the data using the sockets. When the communication between the mobile terminal 10 and the Web server 1 is completed, the mobile terminal 10 closes the sockets. The mobile terminal 10 performs this process for each of the sockets allocated to the LTE network and performs socket communication through the LTE network.

In this state, the mobile terminal 10 determines the ratio of the sockets which are allocated to a first wireless interface using the Wi-Fi network to the sockets which are allocated to a second wireless interface using the LTE network, on the basis of the radio quality of the Wi-Fi network. Then, the mobile terminal 10 generates sockets at the determined ratio and transmits data. Then, the mobile terminal 10 measures the amount of traffic through the first wireless interface and the amount of traffic through the second wireless interface and corrects the number of sockets allocated to the first wireless interface and the second wireless interface on the basis of the measured amount of traffics.

For example, the mobile terminal 10 determines the allocation ratio of the sockets to be 7:3 on the basis of the radio quality of the Wi-Fi network and performs socket communication. Then, the mobile terminal 10 measures the throughput of each wireless interface and detects that the throughput ratio is 1:9. Then, the mobile terminal 10 changes the number of sockets allocated such that the throughput ratio is close to the ratio of the sockets.

That is, the mobile terminal 10 detects that the actual throughput ratio is 1:9 even though the ratio of the sockets allocated to the Wi-Fi network to the sockets allocated to the LTE network has been determined to be 7:3. In this case, the mobile terminal 10 performs control such the allocation ratio of 10 sockets to the Wi-Fi network and the LTE network is not 7:3, but is 10:0 and is equal to the value determined from the quality of wireless communication.

As such, the mobile terminal 10 performs socket communication at the ratio determined on the basis of the radio quality, using the Wi-Fi network and the LTE network at the same time, and changes the number of sockets allocated such that the actual throughput ratio is close to the determined ratio. In this way, the communication performance is improved.

Hardware Configuration

Figure 2:
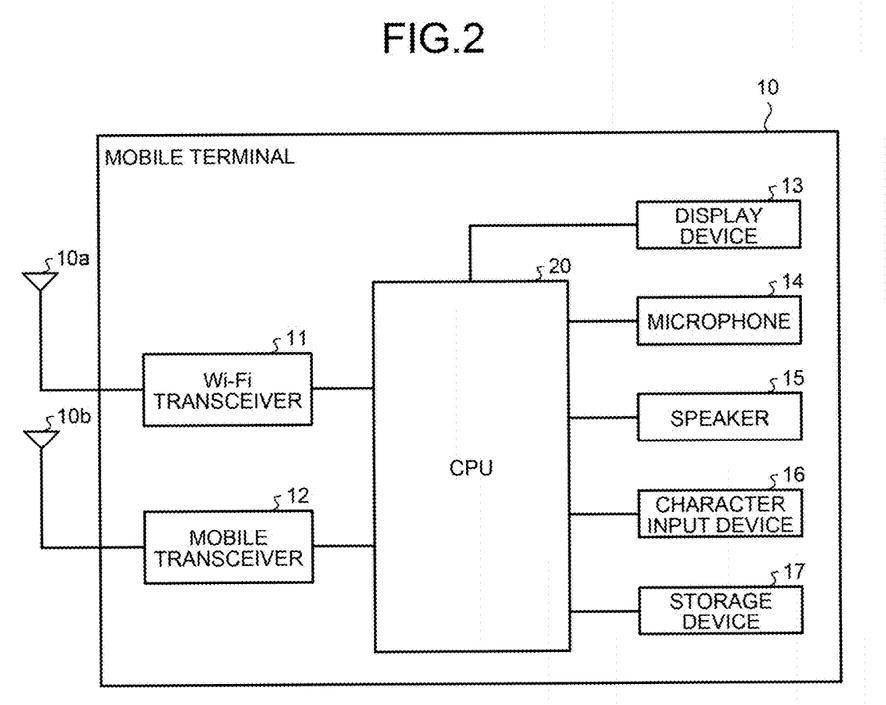
FIG. 2 is a diagram illustrating an example of the hardware configuration of a mobile terminal according to the first embodiment.

FIG. 2 is a diagram illustrating an example of the hardware configuration of the mobile terminal according to the first embodiment. As illustrated in FIG. 2, the mobile terminal 10 includes a Wi-Fi transceiver 11, a mobile transceiver 12, a display device 13, a microphone 14, a speaker 15, a character input device 16, a storage device 17, and a central processing unit (CPU) 20.

The Wi-Fi transceiver 11 performs communication through the wireless LAN 3, such as a Wi-Fi network, using an antenna 10a. A Wi-Fi IP address is set in the Wi-Fi transceiver 11. For example, the Wi-Fi transceiver 11 establishes a connection to the Web server 1, using the IP address, and transmits and receives data.

The mobile transceiver 12 performs communication through the mobile network 2, such as an LTE network, using an antenna 10b. An LTE IP address is set in the mobile transceiver 12. For example, the mobile transceiver 12 establishes a connection to the Web server 1, using the IP address, and transmits and receives data.

The display device 13 is, for example, a touch panel or a display and displays various kinds of information. The microphone 14 collects a voice and inputs the collected voice to the CPU 20. The speaker 15 outputs the voice input from the CPU 20.

The character input device 16 is, for example, a keyboard or a keyboard which is displayed on a touch panel, receives various inputs from the user, and outputs the inputs to the CPU 20. The storage device 17 is, for example, a memory or a hard disk and stores, for example, the programs executed by the CPU 20, the processing results which are generated by the programs executed by the CPU 20, and various tables.

The CPU 20 is a processing unit which is in charge of all of the processes of the mobile terminal 10. The CPU 20 reads a program from the storage device 17 and performs processes. For example, the CPU 20 operates a process that performs processing which will be described after FIG. 3. In addition, two or more CPUs 20 may be provided.

Functional Structure

Figure 3:
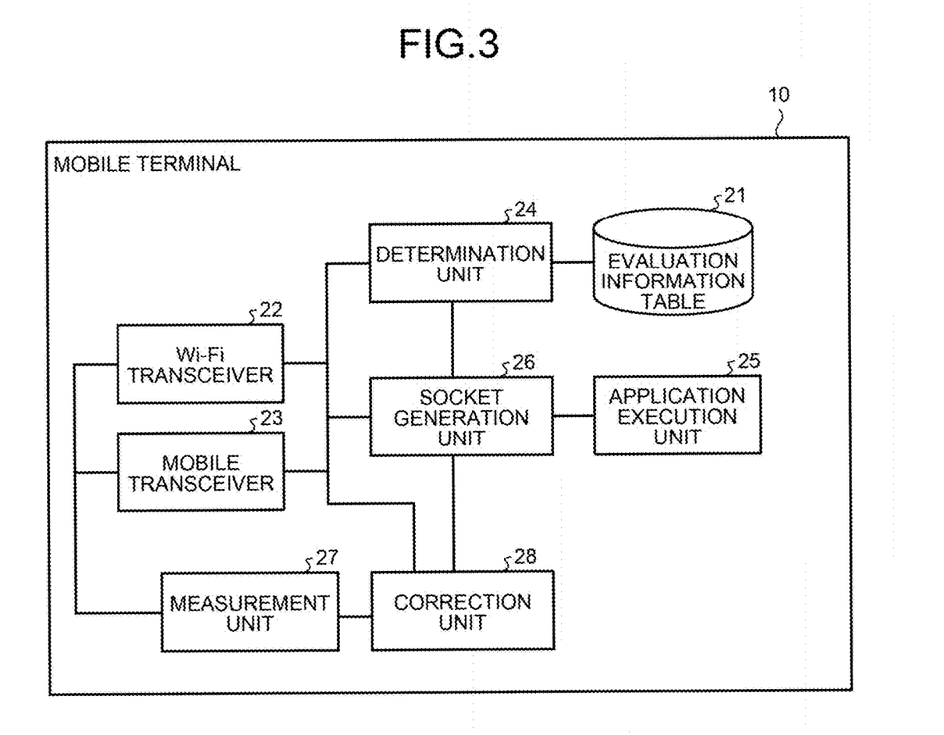
FIG. 3 is a functional block diagram illustrating the functional structure of the mobile terminal according to the first embodiment.

FIG. 3 is a functional block diagram illustrating the functional structure of the mobile terminal according to the first embodiment. As illustrated in FIG. 3, the mobile terminal 10 includes an evaluation information table 21, a Wi-Fi transceiver 22, a mobile transceiver 23, a determination unit 24, an application execution unit 25, a socket generation unit 26, a measurement unit 27, and a correction unit 28.

The evaluation information table 21 stores a quality determination logic that determines the ratio of the sockets allocated to each wireless interface on the basis of the radio quality of the Wi-Fi network. Specifically, the evaluation information table 21 stores information that uniquely determines the ratio of the sockets on the basis of the received signal strength indication (RSSI) value and link speed of the Wi-Fi network. For example, the administrator sets the information to be stored in advance.

Figure 4:
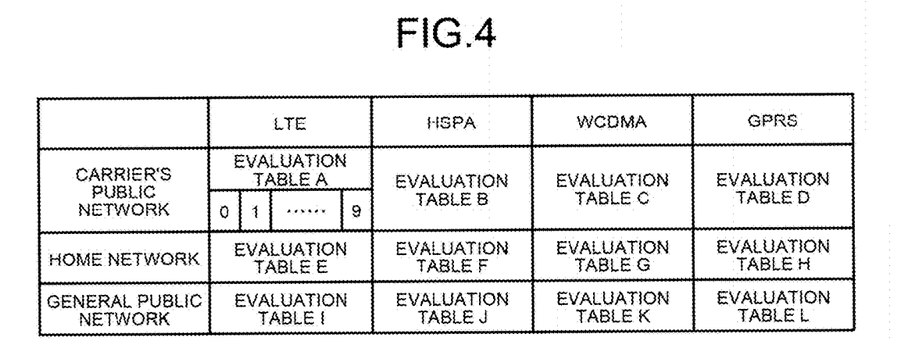
FIG. 4 is a diagram illustrating an example of information stored in an evaluation table.

FIG. 4 is a diagram illustrating an example of the information stored in the evaluation table. As illustrated in FIG. 4, the evaluation information table 21 stores evaluation tables so as to be associated with each mobile network, such as the LTE network, a high-speed downlink packet access (HSPA) network, a wideband code division multiple access (WCDMA (registered trademark)) network, and a general packet radio service (GPRS) network.

For example, when the mobile network is the LTE network and the wireless LAN is the carrier's public network, evaluation is performed with an evaluation table A. When the mobile network is the GPRS network and the wireless LAN is a home network, evaluation is performed with an evaluation table H. In each evaluation table, quality is evaluated at 10 quality levels (bad=0, good=9) which are obtained by adding the quality of the wireless LAN and the quality of the mobile network.

In the evaluation table A, whenever the quality level increases, the ratio of the Wi-Fi network is increased by 1 and the ratio of the LTE network is decreased by 1. For example, Wi-Fi:LTE=0:10 is established at quality level 0 and Wi-Fi:LTE=10:0 is established at quality level 9.

In an evaluation table C, whenever the quality level increases, the ratio of the Wi-Fi network is decreased by 1 and the ratio of the LTE network is increased by 1. For example, Wi-Fi:WCDMA=10:0 is established at quality level 0 and Wi-Fi:WCDMA=0:10 is established at quality level 9.

In an evaluation table E, Wi-Fi:LTE=0:10 is established at quality level 0, Wi-Fi:LTE=6:4 is established at quality level 5, and Wi-Fi:LTE=10:0 is established at quality level 9. For example, the ratio is increased or decreased by 1 in all evaluation tables.

That is, an evaluation value which is determined on the basis of the radio quality of the Wi-Fi network is set to each evaluation table and the ratio of the sockets allocated to the Wi-Fi network to the sockets allocated to the LTE network is associated with each evaluation value.

The Wi-Fi transceiver 22 is a processing unit that generates sockets to be used for the Wi-Fi network and transmits and receives data using the Wi-Fi network. Specifically, the Wi-Fi transceiver 22 establishes a connection to the communication destination, such as the Web server 1, on the Wi-Fi network and transmits data to the communication destination using the socket.

For example, the Wi-Fi transceiver 22 writes data to the socket using the connection which is established with the communication destination such as the Web server 1. The data is read by the communication destination. The communication destination returns the request from the mobile terminal 10 and the mobile terminal 10 receives the data using the socket. When the communication between the mobile terminal 10 and the communication destination is completed, the Wi-Fi transceiver 22 closes the socket.

When the communication destination writes data to the socket, the Wi-Fi transceiver 22 reads the data from the socket, using the connection established with the communication destination. In this way, the Wi-Fi transceiver 22 transmits and receives data using Wi-Fi socket communication.

The mobile transceiver 23 is a processing unit that generates sockets to be used for the LTE network and transmits and receives data using the LTE network. Specifically, the mobile transceiver 23 establishes a connection to the communication destination, such as the Web server 1, on the LTE network and transmits data to the communication destination using the socket.

For example, the mobile transceiver 23 writes data to the socket using the connection established with the communication destination and the communication destination reads the data. The communication destination returns the request from the mobile terminal 10 and the mobile terminal 10 receives the data using the socket. When the communication between the mobile terminal 10 and the communication destination is completed, the mobile transceiver 23 closes the socket.

When the communication destination writes data to the socket, the mobile transceiver 23 reads the data from the socket, using the connection established with the communication destination. In this way, the mobile transceiver 23 transmits and receives data using LTE socket communication.

The determination unit 24 is a processing unit that determines the ratio of the sockets allocated to the Wi-Fi transceiver 22 to the sockets allocated to the mobile transceiver 23 on the basis of the radio quality of the Wi-Fi network and the radio quality of the LTE network. Specifically, the determination unit 24 periodically acquires the environment, RSSI value, and link speed of the wireless LAN and the type of mobile network and specifies a corresponding evaluation table with reference to the evaluation information table 21. Then, the determination unit 24 determines the allocation ratio of the sockets on the basis of the corresponding evaluation table.

For example, the determination unit 24 specifies an evaluation table G on the basis of the type of wireless LAN and the type of mobile network. Then, the determination unit 24 multiplies the RSSI value acquired from, for example, an access point by the link speed and divides the multiplied value by a predetermined constant to calculate an evaluation value "3". Then, the determination unit 24 specifies the ratio which is associated with the evaluation value "3" in the evaluation table G and notifies the socket generation unit 26 of the ratio.

The application execution unit 25 is a processing unit that executes applications. Specifically, the application execution unit 25 reads an application program desired by the user from, for example, the storage device 17, develops the program in the memory, and executes the application, in response to an instruction from the user.

The socket generation unit 26 is a processing unit that generates sockets on the basis of the determined socket allocation ratio. Specifically, the socket generation unit 26 generates 10 sockets at a time on the basis of the allocation ratio. The number of sockets allocated at a time can be arbitrarily set. The socket generation unit 26 generates one socket at a time.

For example, it is assumed that the socket generation unit 26 generates 10 sockets at a time and the determination unit 24 determines the ratio of the sockets allocated to the Wi-Fi network to the sockets allocated to the LTE network to be 7:3. In this case, the socket generation unit 26 generates seven sockets in the Wi-Fi transceiver 22 and generates three sockets in the mobile transceiver 23 among 10 sockets to be generated at the next time.

In addition, it is assumed that the socket generation unit 26 generates a socket per one socket at a time and the determination unit 24 determines the ratio of the sockets allocated to the Wi-Fi network to the sockets allocated to the LTE network to be 9:1. In this case, the socket generation unit 26 generates sockets in the Wi-Fi transceiver 22 nine times and generates a socket in the mobile transceiver 23 once.

The socket generation unit 26 changes the number of sockets generated, in response to a correction instruction from the correction unit 28 which will be described below. For example, when the determination unit 24 determines the allocation ratio of the sockets to be Wi-Fi:LTE=7:3 and an instruction to change the allocation ratio of the sockets to Wi-Fi:LTE=10:0 is received from the correction unit 28, the socket generation unit 26 generates all of 10 sockets in the Wi-Fi transceiver 22.

When the determination unit 24 determines the allocation ratio of the sockets to be Wi-Fi:LTE=7:3 and an instruction to change the allocation ratio of the sockets to Wi-Fi:LTE=5:5 is received from the correction unit 28, the socket generation unit 26 generates five sockets in each of the Wi-Fi transceiver 22 and the mobile transceiver 23. When receiving an instruction to cancel the correction process from the correction unit 28, the socket generation unit 26 generates sockets on the basis of the ratio determined by the determination unit 24.

The measurement unit 27 is a processing unit that measures the throughput of the Wi-Fi transceiver 22 and the throughput of the mobile transceiver 23. Specifically, when socket communication starts, the measurement unit 27 measures the amount of data transmitted by each transceiver at a predetermined interval of, for example, two minutes. Then, the measurement unit 27 outputs the measured throughputs to the correction unit 28.

The correction unit 28 is a processing unit that changes the number of sockets in each wireless interface on the basis of the throughput ratio measured by the measurement unit 27. Specifically, the correction unit 28 calculates the ratio of the throughput of the Wi-Fi network to the throughput of the LTE network. Then, the correction unit 28 compares the throughput ratio with the ratio determined by the determination unit 24. The correction unit 28 changes the number of sockets allocated to each interface and controls throughput such that the throughput ratio is equal to the ratio determined by the determination unit 24.

For example, when the number of Wi-Fi sockets is large at the ratio determined by radio quality and the throughput of the LTE network is high at the throughput ratio, the correction unit 28 transmits an instruction to perform the correction process to the socket generation unit 26 such that the number of Wi-Fi sockets is further increased.

As a detailed numerical example, when the ratio determined by the radio quality is Wi-Fi:LTE=7:3 and the throughput ratio is Wi-Fi:LTE=5:5, the correction unit 28 transmits an instruction to correct the ratio to Wi-Fi:LTE=10:0 to the socket generation unit 26. That is, the correction unit 28 increases the number of sockets which are newly allocated to the Wi-Fi network such that the throughput of the Wi-Fi network increases.

When the ratio determined by the radio quality is Wi-Fi:LTE=7:3 and the throughput ratio is Wi-Fi:LTE=9:1, the correction unit 28 transmits an instruction to correct the ratio to Wi-Fi:LTE=0:10 to the socket generation unit 26. That is, the correction unit 28 reduces the number of sockets which are newly allocated to the Wi-Fi network such that the throughput of the Wi-Fi network is reduced.

As such, the correction unit 28 corrects the ratio of the sockets allocated to each interface such that the overall throughput ratio after the start of socket communication is close to the ratio determined by the radio quality. In addition, after the correction process starts, the correction unit 28 periodically performs the correction process. When the throughput ratio is equal to the ratio determined by the determination unit 24, the correction unit 28 notifies the socket generation unit 26 of the end of the correction process.

Correction Process

Figure 5:
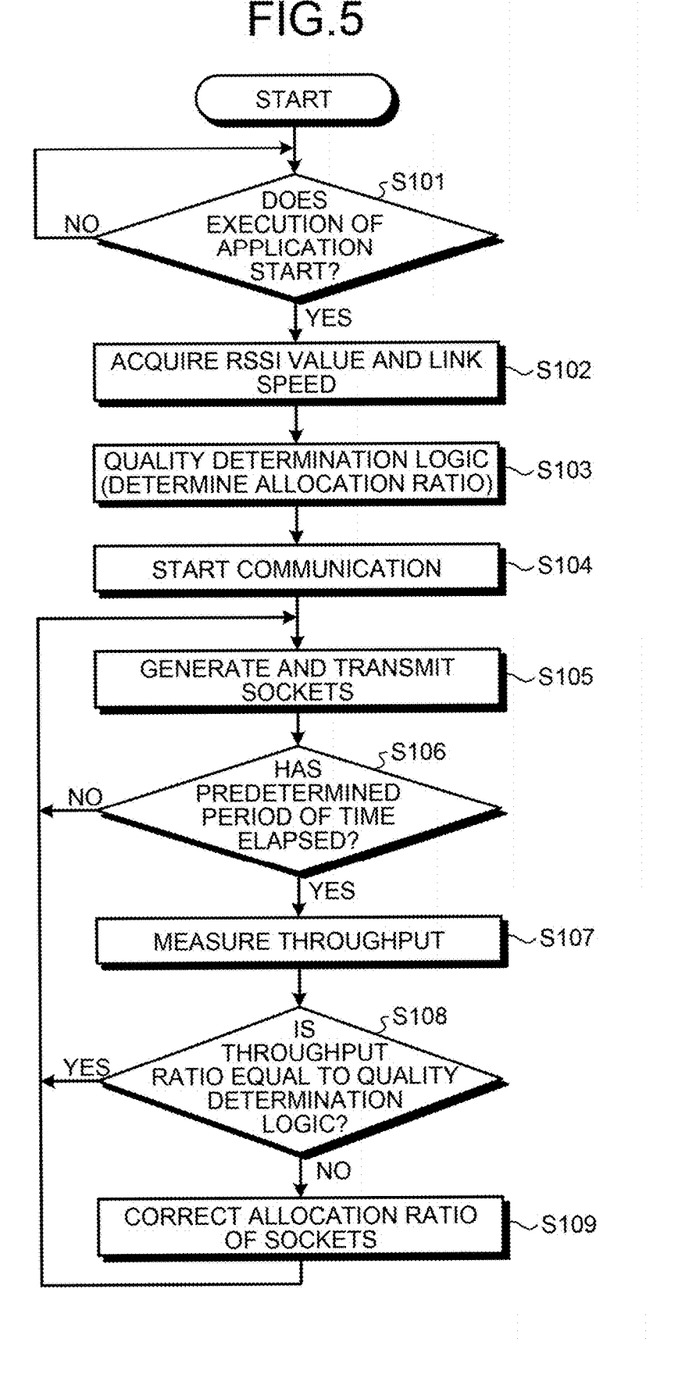
FIG. 5 is a flowchart illustrating the flow of a correction process according to a first embodiment.

FIG. 5 is a flowchart illustrating the flow of the correction process according to the first embodiment. As illustrated in FIG. 5, when the application execution unit 25 executes an application (step S101: Yes), the determination unit 24 acquires the RSSI value of the Wi-Fi network and the link speed of the LTE network (step S102).

Then, the determination unit 24 determines the allocation ratio using the quality determination logic (step S103). Specifically, the determination unit 24 determines the allocation ratio corresponding to the RSSI value and the link speed with reference to the evaluation information table 21.

Then, the socket generation unit 26 generates sockets in each interface at the determined ratio and starts socket communication (step S104 and step S105).

When a predetermined period of time has elapsed from the start of communication (step S106: Yes), the measurement unit 27 measures the throughput of the Wi-Fi transceiver 22 and the throughput of the mobile transceiver 23 (step S107). Then, the correction unit 28 determines whether the quality determination logic (ratio) determined in step S103 is equal to the throughput ratio (step S108).

When the quality determination logic (ratio) is equal to the throughput ratio (step S108: Yes), the correction unit 28 repeatedly performs the process after step S105, without performing correction. On the other hand, when the quality determination logic (ratio) is not equal to the throughput ratio (step S108: No), the correction unit 28 corrects the allocation ratio of the sockets such that the throughput ratio is close to the ratio determined by the quality determination logic (step S109).

Change Process

Figure 6:
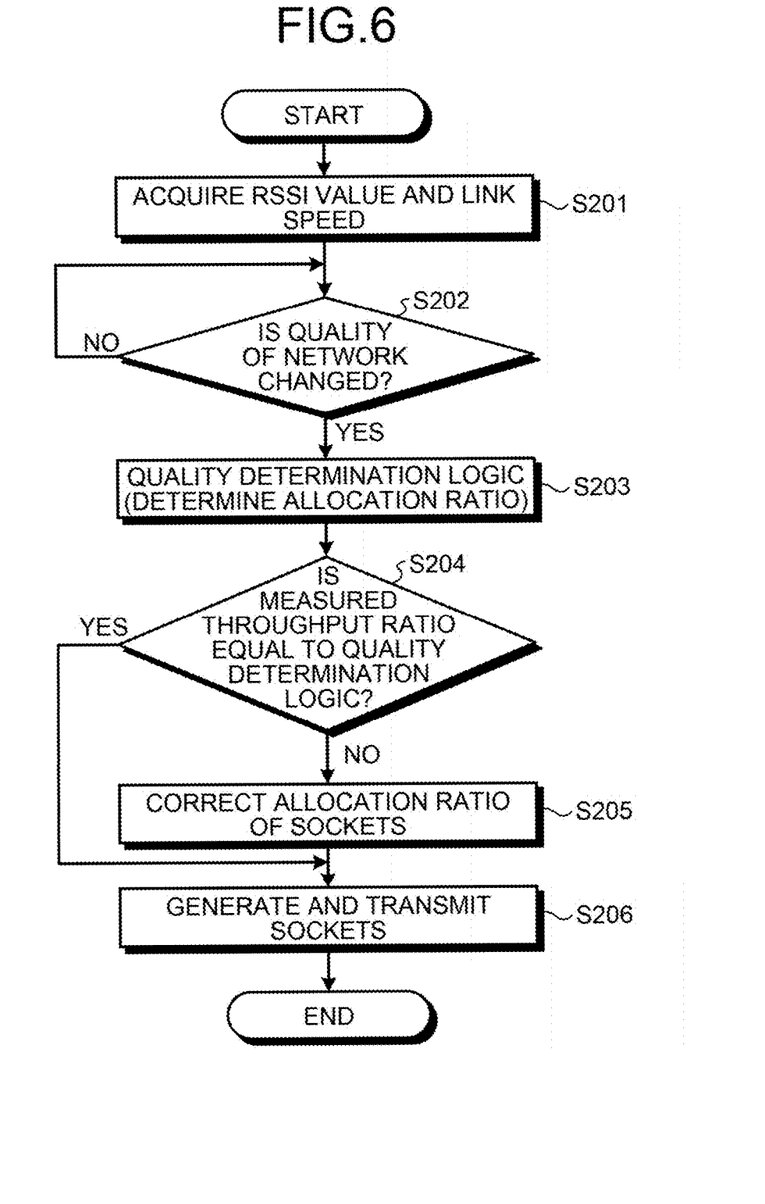
FIG. 6 is a flowchart illustrating the flow of a correction process according to the first embodiment when network quality is changed.

FIG. 6 is a flowchart illustrating the flow of a correction process when the quality of the network according to the first embodiment is changed. As illustrated in FIG. 6, the determination unit 24 periodically acquires the RSSI value and the link speed (step S201) and periodically determines whether the quality of the network is changed (step S202).

Then, when a change in the quality of the network is detected (step S202: Yes), the determination unit 24 determines the allocation ratio of the sockets using the quality determination logic (step S203). Then, the correction unit 28 compares the measured throughput ratio with the ratio which is newly determined by the quality determination logic (step S204).

When the correction unit 28 determines that the ratios are equal to each other (step S204: Yes), the socket generation unit 26 generates sockets at the determined socket allocation ratio and transmits data (step S206).

On the other hand, when the measured throughput ratio is different from the ratio which is newly determined by the quality determination logic (step S204: No), the correction unit 28 corrects the allocation ratio of the sockets such that the throughput ratio is close to the ratio determined by the quality determination logic (step S205).

Then, the socket generation unit 26 generates sockets at the socket allocation ratio corrected by the correction unit 28 and transmits data (step S206).

Examples

Figure 7:
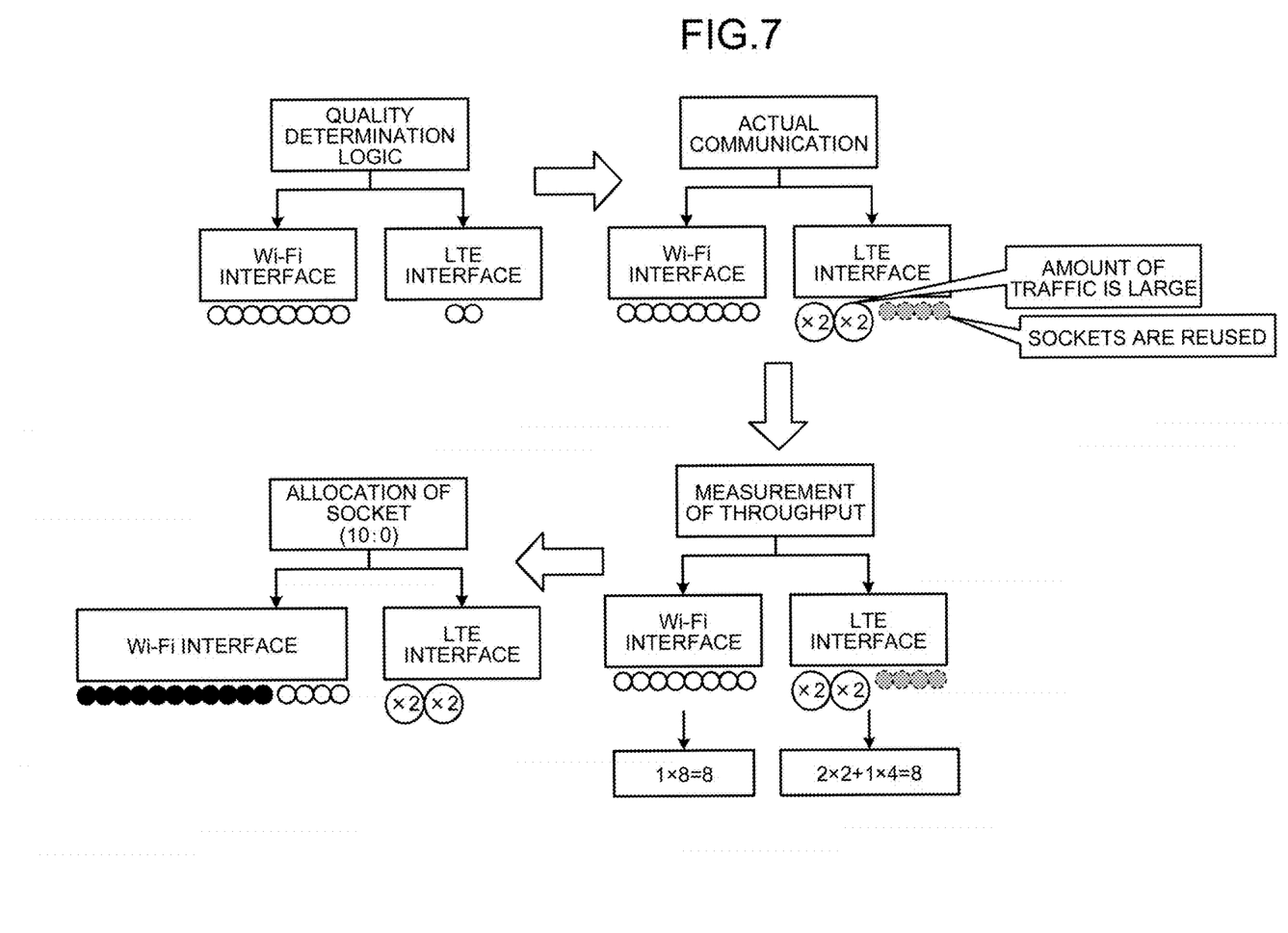
FIG. 7 is a diagram illustrating the correction of a socket ratio according to the first embodiment.

FIG. 7 is a diagram illustrating the correction of the socket ratio according to the first embodiment. As illustrated in FIG. 7, first, when an application is executed, the mobile terminal 10 determines the allocation ratio to be Wi-Fi:LTE=8:2 using the quality determination logic. Then, the mobile terminal 10 generates eight sockets in the Wi-Fi interface and generates two sockets in the LTE interface among 10 sockets. Then, the mobile terminal 10 starts socket communication.

Then, the mobile terminal 10 measures the actual throughput of communication and detects that the amount of data in the LTE sockets is large and the sockets are reused.

Specifically, the mobile terminal 10 detects that the amount of data transmitted through two LTE sockets is two times more than the amount of data transmitted through the Wi-Fi sockets, two LTE sockets are reused, and communication corresponding to eight sockets (=2×2+1×4) is performed. The mobile terminal 10 detects that the number of Wi-Fi sockets is eight. As a result, the mobile terminal 10 specifies the throughput ratio to be Wi-Fi:LTE=5:5.

Then, the mobile terminal performs control such that most of the next 10 sockets are allocated to the Wi-Fi interface since the ratio determined by the quality determination logic is Wi-Fi:LTE=8:2 and the throughput ratio is Wi-Fi:LTE=5:5. Specifically, the mobile terminal generates all of the next 10 sockets in the Wi-Fi interface and starts socket communication.

In the example illustrated in FIG. 7, four sockets which are reused among the LTE sockets are released and four sockets among the Wi-Fi sockets are released. However, this example is an illustrative example. The time when the next sockets are allocated does not always coincide with the time when the generated sockets are released. The allocation of the sockets and the release of the generated sockets may be performed at different times.

Effect

As such, the mobile terminal 10 can start communication at the communication ratio calculated by the quality determination logic, periodically measure the amount of traffic through each interface, and perform correction such that the communication ratio is close to the value calculated by the quality determination logic. Therefore, when using a link aggregation function, the mobile terminal 10 can perform control such that the actual throughput is close to the ideal ratio and can obtain the communication performance suitable for a communication environment.

[b] Second Embodiment

The embodiment of the invention has been described above. However, the invention is not limited to the above-described embodiment and various modifications and changes of the invention can be made.

Evaluation Table

The evaluation table according to the above-described embodiment is an illustrative example and the invention is not limited thereto. For example, the evaluation table can store information for uniquely determining the socket ratio on the basis of the RSSI value and link speed of the Wi-Fi network.

Correction Timing

In the above-described embodiment, the mobile terminal 10 acquires the throughput ratio after a predetermined period of time has elapsed and determines whether to perform correction. However, the invention is not limited thereto. For example, the mobile terminal 10 may acquire the throughput ratio for every 10 sockets and determine whether to perform correction. In this case, it is possible to correct the generation ratio of the sockets at the time when the sockets are generated. Therefore, the communication performance is expected to be improved at high speed.

The mobile terminal 10 does not always change the socket allocation ratio on the basis of the throughput ratio. For example, when the throughput of the Wi-Fi network is greater than an ideal value, the mobile terminal 10 may allocate the next sockets to the LTE interface. As such, the mobile terminal 10 does not correct the socket allocation ratio, but may correct the number of sockets allocated to each interface.

Second and Subsequent Updates of Ratio

For example, the mobile terminal 10 can perform socket communication at the socket ratio determined by the quality determination logic and correct the socket ratio using the throughput ratio. Then, when radio quality is changed, the mobile terminal 10 can change the socket ratio using a plurality of methods.

Specifically, the mobile terminal 10 can perform control using the same method as that in the first socket ratio correction process. For example, the mobile terminal 10 determines a new socket allocation ratio on the basis of new radio quality and the quality determination logic. Then, the mobile terminal 10 starts socket communication at the new socket ratio. Then, the mobile terminal 10 measures throughput and corrects the allocation of the sockets such that the throughput is equal to the new socket ratio.

As another method, the mobile terminal 10 can immediately control throughput such that the throughput is equal to a new socket allocation ratio determined by the new radio quality is obtained. For example, the mobile terminal 10 determines the new socket ratio on the basis of the new radio allocation quality and the quality determination logic. Then, the mobile terminal 10 corrects the allocation of the sockets, on the basis of the previously measured throughput ratio, such that the throughput is equal to the new socket allocation ratio.

As such, the mobile terminal 10 can use each evaluation table to determine the socket ratio in the first update process and use each evaluation table to determine the throughput ratio in the second and subsequent update processes. Therefore, it is possible to rapidly obtain an ideal communication performance.

Structure of System and Others

Each structure of the apparatus illustrated in the drawings is not always the physical structure illustrated in the drawings. That is, the components can be dispersed or integrated in an arbitrary unit. In addition, all or some of the processing functions of each apparatus can be implemented by a CPU and the program which is analyzed and executed by the CPU or they can be implemented as hardware by a wired logic.

In addition, among the processes described in this embodiment, all or some of the processes that are automatically performed may be manually performed. Alternatively, all or some of the processes that are manually performed may be automatically performed by a known method. The processing procedure, the control procedure, the specific names, and information including various kinds of data and parameters which are described in the specification and the drawings may be arbitrarily changed unless otherwise specified.

The mobile terminal 10 according to this embodiment can read a wireless communication control program and execute the wireless communication control program to implement the same functions as those described with reference to, for example, FIG. 3. For example, the mobile terminal 10 develops, in the memory, a program which has the same functions as the Wi-Fi transceiver 22, the mobile transceiver 23, the determination unit 24, the application execution unit 25, the socket generation unit 26, the measurement unit 27, and the correction unit 28. Then, the mobile terminal 10 executes the program which implements the same processes as the Wi-Fi transceiver 22, the mobile transceiver 23, the determination unit 24, the application execution unit 25, the socket generation unit 26, the measurement unit 27, and the correction unit 28 to perform the same processes as those in the above-described embodiment.

The program can be distributed through a network such as the Internet. In addition, the program can be recorded on a computer-readable recording medium, such as a hard disk, a flexible disk (FD), a CD-ROM, an MO, or a DVD and the computer can read the program from the recording medium and execute the program.

According to an embodiment, it is possible to improve the communication performance.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
   a memory; and
   a processor that is connected to the memory, wherein the processor executes a process including:
   determining a first ratio of network sockets, when an application is executed, which are allocated to a first wireless interface using a mobile network and network sockets which are allocated to a second wireless interface using a wireless LAN, on the basis of a radio quality of the mobile network and a radio quality of the wireless LAN;
   setting a value of a second ratio of network sockets to a value of the first ratio of network sockets when the first ratio is determined at the determining;
   generating a predetermined number of network sockets at a time;
   allocating the network sockets on the basis of the second ratio determined at the determining and performing wireless communication;
   measuring an amount of traffic through the first wireless interface and an amount of traffic through the second wireless interface in the wireless communication;
   increasing the second ratio to increase the sockets allocated to the first wireless interface when a ratio of network sockets calculated based on the amount of traffic through the first wireless interface and the second wireless interface measured at the measuring is less than the first ratio; and
   decreasing the second ratio to decrease the sockets allocated to the first wireless interface when a ratio of network sockets calculated based on the amount of traffic through the first wireless interface and the second wireless interface measured at the measuring is greater than the first ratio.

2. The wireless communication apparatus according to claim 1,
   wherein the second ratio is increased or decreased such that the ratio of the amounts of traffic measured at the measuring is equal to the first ratio.

3. The wireless communication apparatus according to claim 1,
   wherein the determining includes acquiring the radio quality of the mobile network and the radio quality of the wireless LAN at a predetermined interval and changing the first ratio of the network sockets on the basis of the changed radio quality when any one of the radio qualities is changed, and
   the second ratio is increased or decreased such that the ratio of the amounts of traffic previously measured at the measuring is equal to the ratio changed at the determining.

4. A wireless communication method comprising:
   determining a first ratio of network sockets, when an application is executed, which are allocated to a first wireless interface using a mobile network and network sockets which are allocated to a second wireless interface using a wireless LAN, on the basis of a radio quality of the mobile network and a radio quality of the wireless LAN, using a processor;
   setting a value of a second ratio of network sockets to a value of the first ratio of network sockets when the first ratio is determined at the determining;
   generating a predetermined number of network sockets at a time;
   allocating the network sockets on the basis of the determined second ratio and performing wireless communication, using a processor;
   measuring an amount of traffic through the first wireless interface and an amount of traffic through the second wireless interface in the wireless communication;
   increasing the second ratio to increase the sockets allocated to the first wireless interface when a ratio of network sockets calculated based on the measured amounts of traffic is less than the first ratio; and
   decreasing the second ratio to decrease the sockets allocated to the first wireless interface when a ratio of network sockets calculated based on the measured amounts of traffic is greater than the first ratio.

5. A non-transitory computer-readable recording medium having stored a wireless communication program causing a computer to execute a process comprising:
   determining a first ratio of network sockets, when an application is executed, which are allocated to a first wireless interface using a mobile network and network sockets which are allocated to a second wireless interface using a wireless LAN, on the basis of a radio quality of the mobile network and a radio quality of the wireless LAN,
   setting a value of a second ratio of network sockets to a value of the first ratio of network sockets when the first ratio is determined at the determining;
   generating a predetermined number of network sockets at a time;
   allocating the network sockets on the basis of the determined second ratio and performing wireless communication;
   measuring an amount of traffic through the first wireless interface and an amount of traffic through the second wireless interface in the wireless communication;
   increasing the second ratio to increase the sockets allocated to the first wireless interface when a ratio of network sockets calculated based on the measured amounts of traffic is less than the first ratio; and
   decreasing the second ratio to decrease the sockets allocated to the first wireless interface when a ratio of network sockets calculated based on the measured amounts of traffic is greater than the first ratio.

* * * * *